Feb. 23, 1954  R. M. HOVLAND  2,669,749
SAUSAGE STUFFING AND MOLDING DEVICE
Filed Jan. 11, 1951
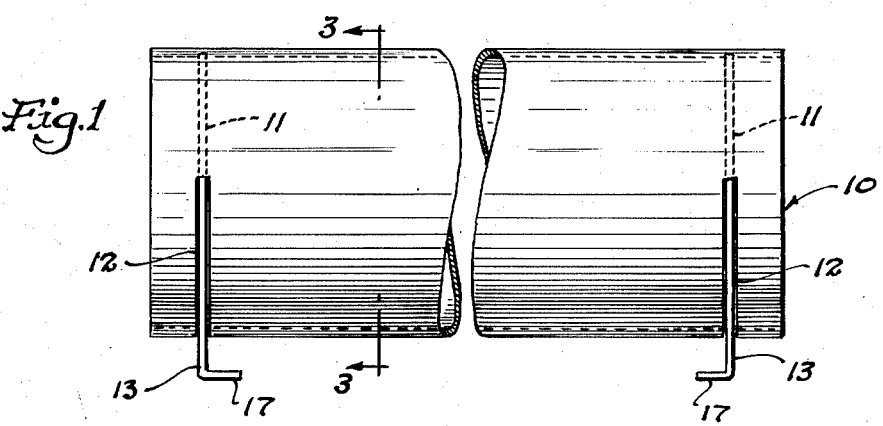
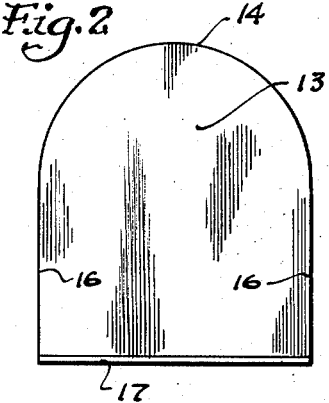
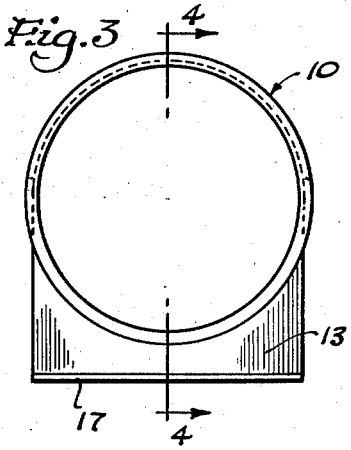
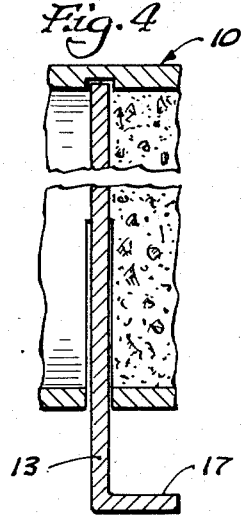
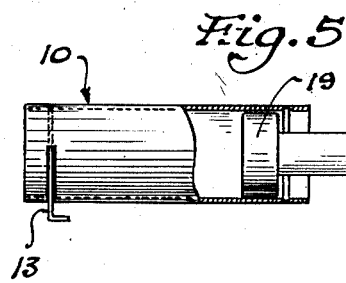
INVENTOR.
Roger M. Hovland
BY
R. A. Story
ATTORNEY Patented Feb. 23, 1954

2,669,749

UNITED STATES PATENT OFFICE 2,669,749

SAUSAGE STUFFING AND MOLDING DEVICE

Roger M. Hovland, Colfax, Wis., assignor to Swift & Company, Chicago, Ill., a corporation of Illinois Application January 11, 1951, Serial No. 205,482

2 Claims. (Cl. 17—35)

1

The present invention relates to a mold for sausage or the like and an apparatus for stuffing said mold.

As is well known in the art, it has been the practice for many years to stuff the comminuted sausage mix into casings wherein the mix was handled and cooked. Such casings were only used once and discarded. Efforts have been made to modernize this practice, but, in general, they were no more than a change in casing material.

The present invention is directed to the use of a rigid or semi-rigid mold to replace the limp, flexible casing heretofore used. The principal object of the present invention is to provide such a mold which is simple to construct and use and which is easily disassembled to be readily cleaned.

A particular feature of the present invention is the structure of the co-operating mold and end gates therefor wherein the gates form feet to position the mold above a suitable supporting surface and allow the circulation of the cooking fluid completely about the mold. This insures the even heating of the mix within the mold and the elimination of overcooked or undercooked spots in the sausage. The mold is steadily balanced on the feet in such a position that it can be upset only by the most violent movements.

I have devised a novel horn which is readily adapted for use with a conventional sausage stuffer to quickly fill the mold of this invention with only a minimum of movement and effort on the part of an operator. The horn, pressurized by the stuffer, co-operates with the mold to completely fill the mold with a minimum amount of leakage and waste.

Additional objects and advantages include the following:

A mold which forms the sausage with square ends, thus, eliminating waste in the cutting of the sausage after it is removed from the mold; a mold which is readily formed by simple metal-working operations; a mold which is low in first cost; and a mold which requires substantially no maintenance.

Further objects and advantages will become apparent from the following description taken in conjunction with the drawings, in which:

Fig. 1 is an elevation of an embodiment of the invention;

Fig. 2 is an elevation of a gate for the mold of Fig. 1;

Fig. 3 is a section taken at line 3—3 of Fig. 1;

Fig. 4 is an enlarged section taken at line 4—4 of Fig. 3; and

Fig. 5 is an elevation on a reduced scale, partially broken away, of the mold being filled with a comminuted mix from a sausage stuffer.

As seen in Figs. 1 and 3, the body of the mold is a tubular shell, generally 10, preferably shaped in the form of a cylinder. Adjacent either end of shell 10 are a pair of grooves 11. Grooves 11 are substantially semi-circular and are so oriented that they lie in the same segmental portion of the cylinder 10. Preferably, the grooves 11 are in parallel planes normal to the longitudinal axis of the shell 10. Co-planar with each of grooves 11 are slots 12, which slots occupy the remaining segmental portion of said cylinder.

A pair of gates 13 are used to close either end of the shell 10. The structure of the gates 13 is best seen in Figs. 2 and 4. One end 14 of each of gates 13 is substantially the same configuration as grooves 11, being semi-circular in the cylindrical embodiment illustrated. Side edges 16 of gates 13 are tangent to the semi-circular end 14. When inserted into the mold, as illustrated in Figs. 1 and 4, the lower portion of gate 13 is engaged by slots 12 upon its being inserted into the cylinder while the upper end 14 is engaged in grooves 11, which slots and grooves act as tracks for the gates.

The lower ends of gates 13 project substantially below the shell 10, as seen in Figs. 1 and 4. This end of each of the gates is bent over to form feet 17 which position the mold above any suitable supporting surface.

The apparatus for filling the mold is illustrated in Fig. 5. The mold 10 is slipped over an abutment 19 attached to stuffing horn 20 of a sausage stuffer 21. Abutment 19 is of the same configuration as that of the inner wall of shell 10 and only slightly smaller in size than that of said inner wall. The difference in size is sufficient to allow the shell to slide longitudinally over the abutment but sufficiently tight to prevent any substantial passage of sausage therebetween.

A gate 13 is inserted into the track therefor formed by slots 12 and grooves 11, and the valve of the sausage stuffer is opened to allow the sausage mix to enter the mold through the stuffing horn. As the mold fills up, the shell will slide outwardly over abutment 19, in due course uncovering the track in the other end of the shell 10. As it does so, the other gate 13 is inserted into said track, thereby trapping the sausage mix between the two end gates. Shell 10 may now be completely removed from horn 20 and deposited upon a suitable surface supported on feet 17 of gates 13.

The foregoing description of a specific embodiment is for the purpose of complying with Section 4888 of the Revised Statutes and should not be construed as imposing unnecessary limitations upon the appended claims.

I claim:

1. Means for molding sausages comprising, in combination with a sausage stuffer having an elongated stuffing horn with an abutment of substantial breadth on one end thereof, a tubular mold adapted to fit over and be supported by said abutment, gate means removably positioned in said mold and adapted to close off each end thereof, at least one of said gate means being positioned a sufficient distance laterally within said mold as to leave, when in closed position, a sufficient portion of said mold still in contact with said abutment to provide support for said mold.

2. Means for molding sausages comprising, in combination with a sausage stuffer having an elongated stuffing horn with an abutment of substantial breadth on one end thereof, a tubular mold adapted to fit over and be supported by said abutment, gate means removably positioned in said mold and adapted to close off each end thereof, at least one of said gate means being positioned a sufficient distance laterally within said mold as to leave, when in closed position, a sufficient portion of said mold still in contact with said abutment to provide support for said mold, said gate means having feet extending externally of said mold whereby the mold may be positioned above a supporting surface on said feet.

ROGER M. HOVLAND.

References Cited in the file of this patent

UNITED STATES PATENTS

| Number | Name | Date |
|---|---|---|
| 1,395,967 | Merli et al. | Nov. 1, 1921 |
| 1,693,261 | Sweetland | Nov. 27, 1928 |
| 1,925,157 | Vogt | Sept. 5, 1933 |
| 2,009,388 | Elliott | July 30, 1935 |
| 2,127,404 | Gullich | Aug. 16, 1938 |
| 2,253,465 | Tomlinson | Aug. 19, 1941 |
| 2,311,843 | Lee | Feb. 23, 1943 |
| 2,597,592 | Minder | May 20, 1952 |